United States Patent [19]
Iwatsuki et al.

[11] Patent Number: 5,764,841
[45] Date of Patent: Jun. 9, 1998

[54] OPTICAL FIBER TRANSMISSION LINE, OPTICAL FIBER TRANSMISSION SYSTEM AND PRODUCTION METHOD THEREOF, AND OPTICAL FIBER COMBINING METHOD

[75] Inventors: Katsumi Iwatsuki; Kenichi Suzuki, both of Yokohama; Shingo Kawai, Yokosuka, all of Japan

[73] Assignee: Nippon Telegraph and Telephone Corporation, Tokyo, Japan

[21] Appl. No.: 840,024

[22] Filed: Apr. 24, 1997

[30] Foreign Application Priority Data

Apr. 25, 1996 [JP] Japan ................. 8-105807

[51] Int. Cl.$^6$ ................................. G02B 6/02
[52] U.S. Cl. .................. 385/123; 385/124; 385/125; 385/126; 385/127; 359/109; 359/180; 359/189
[58] Field of Search ..................... 385/123, 128, 385/15, 24, 27, 28, 50, 51; 359/109, 161, 173, 179, 180, 189

[56] References Cited

U.S. PATENT DOCUMENTS

5,673,354  9/1997  Akasaka et al. ............ 385/127
5,680,491 10/1997  Shigematsu et al. ........ 385/24

OTHER PUBLICATIONS

L.F. Mollenauer et al., "Measurement of Timing Jitter in Filter–Guided Soliton Transmission at 10 Gbits/s and Achievement of 375 Gbits/s–Mm, Error Free, at 12.5 and 15 Gbits/s", Optics Letters, 19(10):704–706 (1994). No Month.

S. Kawai et al., "Demonstration of Error Free Optical Soliton Transmission Over 30000km at 10 Gbit/s with Signal Frequency Sliding Technique", Electronics Letters, 31(17):1463–1464 (1995). No Month.

K.J. Blow et al., "Average Soliton Dynamics and the Operation of Soliton Systems with Lumped Amplifiers", IEEE Photonics Technology Letters, 3(4):369–371 (1991). No Month.

K. Iwatsuki et al., "40Gb/s Distortion–Free Soliton Transmission with Reciprocating Dispersion–Managed Fiber of 1000km Length", OAA '96 ThB–3 pp. 14–17 (1996). No Month.

K. Iwatsuki et al., "40Gb/s Adiabatic and Phase–Stationary Soliton Transmission with Sliding–Frequency Filter Over 4000km Reciprocating Dispersion–Managed Fiber", OAA '96 PDP 6–1—6–5 (1996). No Month.

K. Suzuki et al., "40 Gbit/s Adiabatic and Phase–Stationary Soliton Transmission with Sliding–Frequency Filter Over 4000km Reciprocating Dispersion–Managed Fibre", Electronics Letters, 32(23):2173–2174 (1996). No Month.

(List continued on next page.)

*Primary Examiner*—Phan T. H. Palmer
*Attorney, Agent, or Firm*—Finnegan, Henderson, Farabow, Garrett & Dunner, L.L.P.

[57] ABSTRACT

The optical fiber transmission line according to the present invention comprises first optical fibers having dispersion values greater than the average dispersion value $D_{av}$ over the entire transmission distance and second optical fibers having dispersion values less than the average dispersion value $D_{av}$, wherein the average dispersion value $D_{av}$ over the entire transmission distance is in the anomalous dispersion region, the respective lengths $L_i$ and $L_i'$ of the first and second optical fibers are shorter than the soliton length $Z_0$ (wherein i is an arbitrary natural number), and the relationship between the lengths $L_i$ and $L_i'$ and the larger of the respective differences $D_i$ and $D_i'$ between the dispersion values of the first and second optical fibers and the average dispersion value $D_{av}$ satisfies the following condition:

$$(L_i + L_i')/Z_0 < 0.35/\{1 + 0.20(\text{the larger of } D_i \text{ and } D_i'/D_{av})\}$$

10 Claims, 14 Drawing Sheets

OTHER PUBLICATIONS

N. Edagawa et al., "20Gbit/s, 8100km Straight–Line Single–Channel Soliton–Based RZ Transmission Experiment Using Periodic Dispersion Compensation", ECOC '95, Th.A.3.5, pp. 983–985 (1995). No Month.

L.F. Mollenauer et al., "Wavelength Division Multiplexing with Solitons in Ultra–Long Distance Transmission Using Lumped Amplifiers", Journal of Lightwave Technology, 9(3):362–366 (1991). No Month.

M. Suzuki et al., "10Gbit/s, 9100km Soliton Data Transmission With Alternating–Amplitude Solitons Without Inline Soliton Controls", OAA '93 Post–deadline Paper, pp. 1–5 (1993). No Month.

K. Suzuki et al., "40 Gbit/s—4000km Optical Transmission Utilizing Adiabatic and Phase–Stationary Soliton", IEICE, OCS96–36 (1996–09), pp. 43–49 (1996)—(Abstract attached). No Month.

10: TRANSMISSION OPTICAL FIBER
11: OPTICAL AMPLIFIER
12: OPTICAL FILTER
13: TRANSMITTER
14: RECEIVER

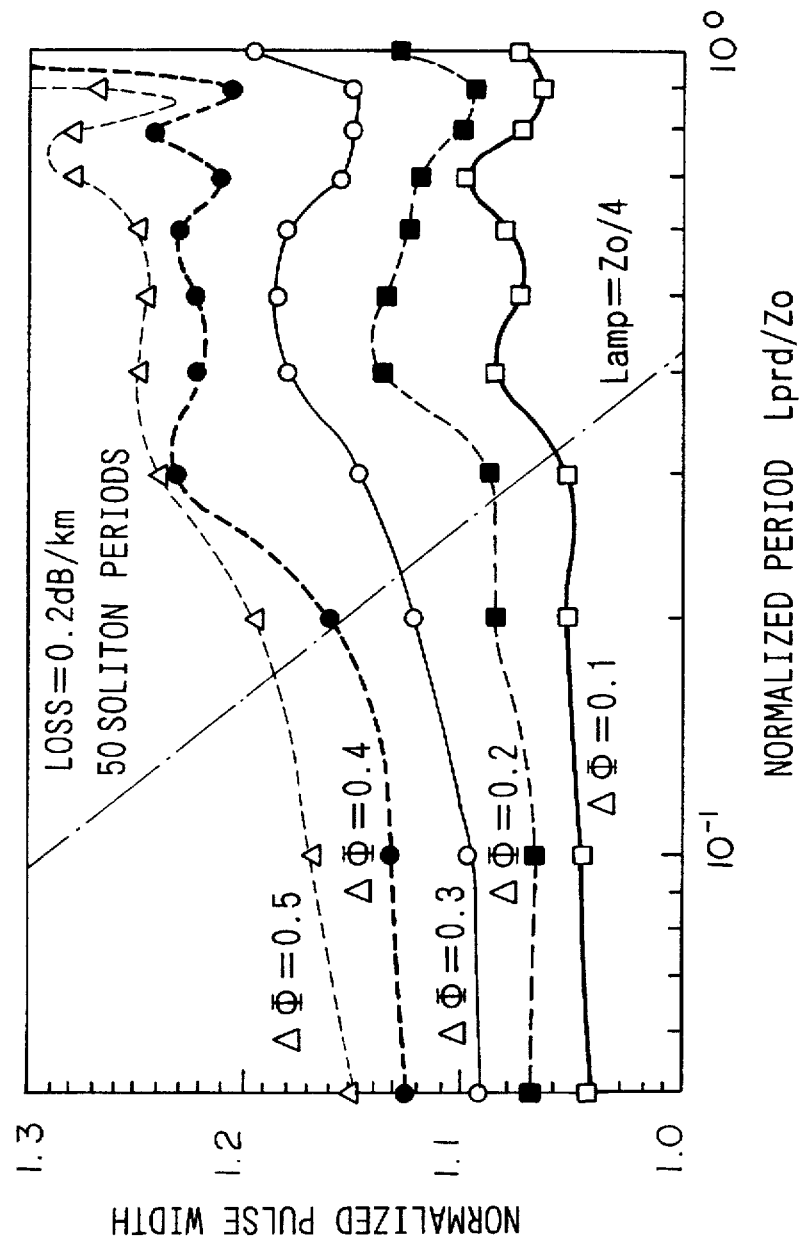

OPTICAL FIBER TRANSMISSION LINE, OPTICAL FIBER TRANSMISSION SYSTEM AND PRODUCTION METHOD THEREOF, AND OPTICAL FIBER COMBINING METHOD

BACKGROUND OF THE INVENTION

1. Technical Field of the Invention

The present invention relates to an optical fiber transmission line, a production method thereof and an optical fiber combining method, which suppresses the fluctuation of dispersion values with respect to transmission distance and makes local average dispersion values equal to the average dispersion value of the entire transmission line; especially to an optical fiber transmission line which is suitable for optical solitons, an optical fiber transmission system using this optical fiber transmission line, a production method thereof and an optical fiber combining method.

2. Background Art

Optical solitons are special types of optical pulses which propagate through optical fibers while maintaining their waveform shapes due to a balance between the dispersion of the optical fiber and the self phase modulation which is a nonlinear effect. The optical intensity waveforms of optical solitons are proportional to $\text{sech}^2(t)$, wherein t is a parameter representing time. If the loss in an optical soliton increases as it propagates through an optical fiber, the self phase modulation which occurs in proportion to the optical pulse intensity decreases, and the optical soliton eventually collapses. A transmission system for easily conveying optical solitons is a simple multiply relayed (1R) transmission system using a plurality of optical amplifiers as shown in FIG. 2A. FIG. 2A is a structural diagram showing a multiply amplified transmission system using a transmitter 13; and a plurality of optical fibers 10 for transmission, optical amplifiers 11 and optical filters 12; and a receiver 14. Additionally, FIG. 2B is a diagram showing an example of the relationship between the transmission distance and the dispersion value of the transmission line in the multiply relayed system. The overall average dispersion value is represented by the thin line, while the local average dispersion values are represented by the single-dotted chain lines.

On the other hand, experimental research has been performed to look into the possibility of ultra-long distance optical soliton transmissions by using recirculating transmission lines wherein the optical fibers are looped as shown in FIG. 3A. The dispersion values of recirculating loops in the transmission direction are such that the dispersion distribution is repeated by each circulation length as shown in FIG. 3B. For this reason, the local average dispersion value averaged over a circulation length is equal to the average dispersion value averaged over the entire transmission distance. The recirculating transmission line shown in FIG. 3A is composed of an optical fiber 20, an erbium-doped fiber amplifier 21, a transmitter 23, an optical switch 24 and a receiver 25. The transmission line as shown in FIG. 3A can be considered to be a uniform transmission line which is ideal for optical solitons. The fact that optical solitons can stably propagate over long distances while maintaining the waveform in uniform transmission lines has already been taught theoretically, and the results of recirculating transmission experiments exceeding transmission distances of 10,000 km have been reported from many research organizations (see [1] L. F. Mollenauer et al., "Measurement of Timing Jitter in Filter-guided Soliton Transmission at 10 Gbits/s and Achievement of 375 Gbits/s-Mm, Error-free, at 12.5 and 15 Gbits/s", *Opt. Lett.*, 19, pp. 704–706 (1994); [2] S. Kawai et al., "Demonstration of Error Free Optical Soliton Transmission Over 30,000 km at 10 Gb/s with Signal Frequency Sliding Technique", *Electron. Lett.*, 31, pp. 1463–1464 (1995); [3] M. Suzuki et al., "10 Gb/s, 9100 km Soliton Data Transmission with Alternating-amplitude Solitons Without Inline Soliton Control", *OAA '93 Post-deadline Paper PD1* (1993)).

However, the dispersion in the transmission lines of 1R transmission systems in practice generally varies in the longitudinal direction as shown in FIG. 2B. That is, the local average dispersion value averaged over a few relay intervals and the average dispersion value averaged over the entire transmission distance are different. In this type of transmission line, the influence of the dispersion which varies along the longitudinal direction causes the optical solitons to generate dispersive waves, so as to eventually collapse. Therefore, the manner in which to construct a uniform transmission line has been an important consideration in order to achieve optical soliton transmissions. Since the dispersion values of dispersion-shifted optical fibers which compose transmission lines have a normal distribution within the range of –3.5 to 3.5 ps/km/nm due to manufacturing constraints, forming uniform transmission lines by selecting optical fibers with exactly matching dispersion values is not an economically favorable method.

SUMMARY OF THE INVENTION

In order to resolve the above-mentioned problems, the present invention has the object of offering an optical fiber transmission line, an optical fiber transmission system and production method thereof, and an optical fiber combining method which allow the dispersion values in a transmission line to be uniform even when using optical fibers with fluctuating dispersion values.

An aspect of the present invention for resolving this problem is an optical fiber transmission line comprising first optical fibers having dispersion values greater than an average dispersion value $D_{av}$ over the entire transmission distance; and second optical fibers having dispersion values less than the average dispersion value $D_{av}$; wherein said first optical fibers and said second optical fibers are connected alternately; the average dispersion value $D_{av}$ over the entire transmission distance is in an anomalous dispersion region; the respective lengths $L_i$ and $L_i'$ of the first and second optical fibers, i being an arbitrary natural number, are shorter than a soliton length $Z_0$; and the relationship between the lengths $L_i$ and $L_i'$ and the larger of the respective differences $D_i$ and $D_i'$ between the dispersion values of the first and second optical fibers and the average dispersion value $D_{av}$ satisfies the following condition:

$$(L_i+L_i')/Z_0 < 0.35/\{1+0.20(\text{the larger of } D_i \text{ and } D_i')/D_{av}\}$$

Another aspect of the present invention is an optical fiber transmission system comprising the above-described optical fiber transmission line, a transmitter for transmitting optical signals to said optical fiber transmission line, and a receiver.

Another aspect of the present invention is a production method for optical fiber transmission lines comprising steps of combining at least one pair of first and second optical fibers having mutually different dispersion values alternately; setting the average dispersion value $D_{av}$ over the entire transmission distance to be in an anomalous dispersion region; making the dispersion values of said first optical fibers greater than the average dispersion value $D_{av}$ of said transmission line; making the dispersion values of said second optical fibers less than the average dispersion value $D_{av}$ of said transmission line; making the respective lengths $L_i$ and $L_i'$ of the first and second optical fibers, i being an arbitrary natural number, shorter than a soliton length $Z_0$; and setting the relationship between the lengths $L_i$ and $L_i'$ and the larger of the respective differences $D_i$ and $D_i'$ between the dispersion values of the first and second optical fibers and the average dispersion value $D_{av}$ so as to satisfy the following condition:

$$(L_i + L_i')/Z_0 < 0.35/\{1 + 0.20(\text{the larger of } D_i \text{ and } D_i')/D_{av}\}$$

Another aspect of the present invention is a method of combining optical fibers comprising steps of combining first optical fibers having dispersion values greater than an average dispersion value $D_{av}$ over the entire transmission distance and second optical fibers having dispersion values less than the average dispersion value $D_{av}$ alternately; choosing the average dispersion value $D_{av}$ over the entire transmission distance to be in an anomalous dispersion region; making the respective lengths $L_i$ and $L_i'$ of the first and second optical fibers, i being an arbitrary natural number, shorter than a soliton length $Z_0$; and making the relationship between the lengths $L_i$ and $L_i'$ and the larger of the respective differences $D_i$ and $D_i'$ between the dispersion values of the first and second optical fibers and the average dispersion value $D_{av}$ satisfy the following condition:

$$(L_i + L_i')/Z_0 < 0.35/\{1 + 0.20(\text{the larger of } D_i \text{ and } D_i')/D_{av}\}$$

Using the present invention, it is possible to economically construct an optical fiber transmission line suitable for use in optical soliton transmissions, having uniform dispersion characteristics, using optical fibers having fluctuating dispersion values.

With the present invention, a transmission line can be formed, for example, by dividing each relay interval in the transmission line into n small intervals, and connecting pairs of two optical fibers having opposite deviations centered with respect to the average dispersion value of the entire transmission line in multiple stages. In this case, the lengths of the small intervals and the dispersion values within the small intervals are determined by controlling the dispersion variation parameters so as to suppress the influence of the dispersion variations and their periods on the pulse widths of optical solitons to within a desired range. By controlling the dispersion values by dividing the transmission line into small intervals in this way, the pool of usable optical fibers is markedly increased so as to improve the economic performance. Additionally, using the transmission line of the present invention suppresses the fluctuation of dispersion values with respect to the transmission distance and allows the structure of the transmission line to be such that the local average dispersion value is equal to the dispersion value of the entire transmission line, thereby allowing stable optical soliton transmissions to be achieved.

BRIEF EXPLANATION OF THE DRAWINGS

FIGS. 2A and 2B are diagrams for explaining a conventional multiply amplified transmission system, of which FIG. 2A shows the structure of the transmission system and FIG. 2B shows the relationship between the transmission distance and dispersion value in the transmission system.

FIGS. 3A and 3B are diagrams for explaining a conventional recirculating transmission system, of which FIG. 3A shows the structure of the transmission system and FIG. 3B shows the relationship between the transmission distance and the dispersion value.

FIG. 6A is a diagram showing the relationship between the normalized dispersion variation period and the normalized pulse width variation when the loss in the transmission line is 0.2 dB/km.

PREFERRED EMBODIMENTS OF THE INVENTION

Figure 1:
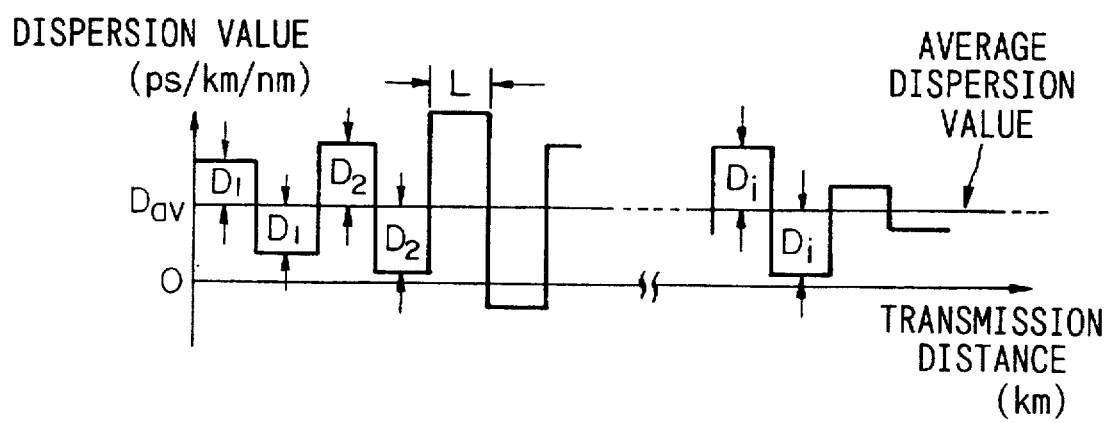
FIG. 1 is a diagram showing the dispersion characteristics of an embodiment of the optical fiber transmission line according to the present invention.

First, an embodiment of the optical fiber transmission line with dispersion management according to the present invention will be explained with reference to FIG. 1. The overall structure of the optical transmission line according to the present embodiment is similar to that shown in FIG. 2A, and the principal characteristics of the present embodiment and the present invention are in the structures of the transmission optical fibers 10 shown in FIG. 2A. In the present embodiment, each transmission optical fiber 10 is formed by connecting a plurality of optical fibers of length L. Additionally, the dispersion values of each pair of adjacent optical fibers are set such that they are symmetrical and centered about a target average dispersion $D_{av}$ so as to be equal to $D_{av}+D_i$ and $D_{av}-D_i$. Here, $D_i$ refers to the difference between the optical fiber dispersion value and the average dispersion value $D_{av}$ in an anomalous dispersion region, and i represents a natural number. The dispersion value $D_i$ is a positive real number which does not exceed the predetermined upper limit of the local dispersion amount $D_iL$. When producing the transmission line, the maximum value of $D_iL$ is determined such that the pulse width variation after transmission with respect to a given transmission speed and transmission distance is no greater than an allowable value, and pairs of optical fibers having mutually symmetrical dispersion values are chosen from among optical fibers having lengths and dispersion values in this range, then these pairs are combined and connected alternately. That is, the transmission line is formed by alternately and repeatedly connecting optical fibers wherein the dispersion values are respectively $D_{av}+D_i$ and $D_{av}-D_i$ in each unit interval L. Additionally, the length L of each optical fiber is chosen so as to be shorter than the soliton period $Z_0$. By managing the dispersion in this manner, it is possible to use all optical fibers having dispersion values between $D_{av}+D_i$ and $D_{av}-D_i$, so that in comparison to optical soliton transmission lines wherein the dispersion is managed by matching all of the optical fibers over the entire transmission distance to a dispersion value of $D_{av}$, the pool of usable optical fibers is dramatically increased, thereby improving the economic performance.

The concept of the present invention will be explained while clarifying the differences with the conventional art. As mentioned above, since the dispersion values of optical fibers fluctuate due to production constraints, forming a uniform optical soliton transmission line has conventionally been considered to be extremely difficult due to economic reasons. Therefore, dispersion control methods for economically forming optical fiber transmission lines suitable for optical soliton transmissions which is the purpose of the present invention have not been considered.

The behavior of optical solitons in transmission lines wherein the dispersion values fluctuate along the direction of transmission can be expressed by the normalized nonlinear Schrödinger Equation given below:

$$-j\frac{\partial u}{\partial z} = \frac{1}{2}\frac{\partial^2 u}{\partial \tau^2} + g(z)|u|^2 u \quad (1)$$

In the above equation, z, u, and g(z) are respectively the normalized transmission distance, the normalized amplitude of the propagating pulse, and a function representing the fluctuation of the dispersion values in the z direction. If there is no fluctuation of the dispersion, g(z)=1, and Equation (1) becomes the usual normalized nonlinear Schrödinger Equation. If the fluctuation in the dispersion values is small and g(z) is treated as a perturbation, then Equation (1) can be solved by approximation as follows:

$$u = \text{sech}(1 + \Omega\tau)\exp[j(\Phi - \Omega z)] \quad (2)$$

$$\frac{d\Phi}{dz} = g(z) - (1 + \Omega^2)/2 \quad (3)$$

(see [4] L. F. Mollenauer et al., "Wavelength Division Multiplexing with Solitons in Ultra-long Distance Transmission Using Lumped Amplifier", *IEEE J. Lightwave Technol.*, pp. 362–367 (1991)). Here, the variable $\Omega$ represents the angular frequency and the variable $\Phi$ represents the phase. Equations (2) and (3) show that the fluctuation of the dispersion values causes disturbances in the phase of the optical soliton carrier frequency.

Figure 4:
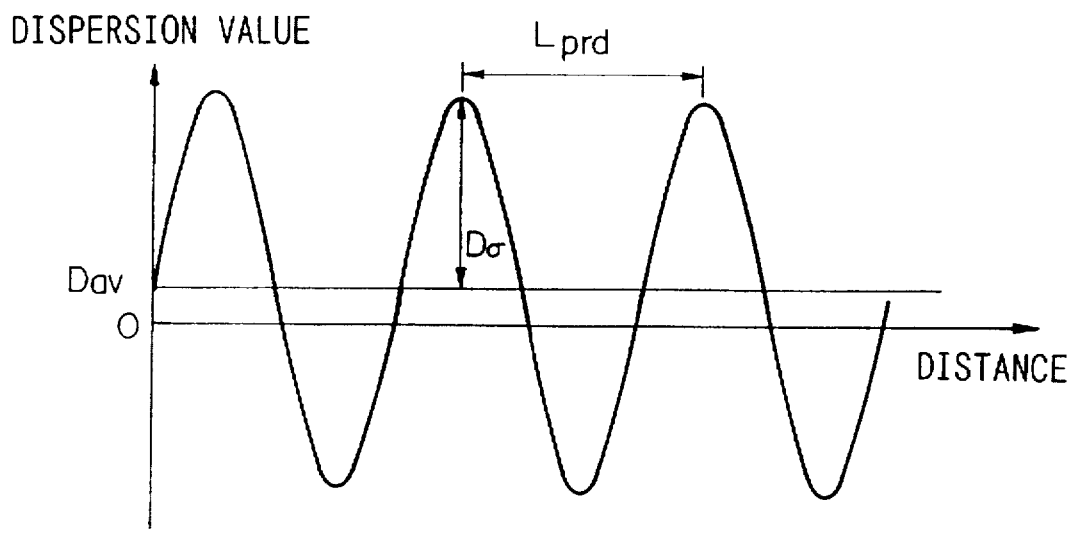
FIG. 4 is a diagram showing a perturbed dispersion distribution to be applied to the normalized nonlinear Schrödinger Equation.

Then, the optical soliton pulse width variation after transmission is determined by numerical analysis of Equation (1) for the case wherein the dispersion values change according to a sine function with a period of $L_{prd}$, an average dispersion value $D_{av}$, and an amplitude $D_0$ as shown in FIG. 4. $D_{av}$ is taken to be in the anomalous dispersion value region. In this case, the phase fluctuation component $\Delta\Phi$ of the optical soliton carrier frequency due to g(z) can be expressed as follows:

$$\Delta\Phi=0.5D_\sigma L_{prd}/(D_{av}Z_0) \quad (4)$$

Here, $Z_0$ is a parameter known as the soliton period, which can be expressed by the pulse width $\tau$, the central frequency $\lambda$ of the pulse, the velocity of light c, and the average dispersion value $D_{av}$ as follows:

$$Z_0=\pi^2 c\tau^2/(\lambda^2 D_{av}) \quad (5)$$

Figure 5:
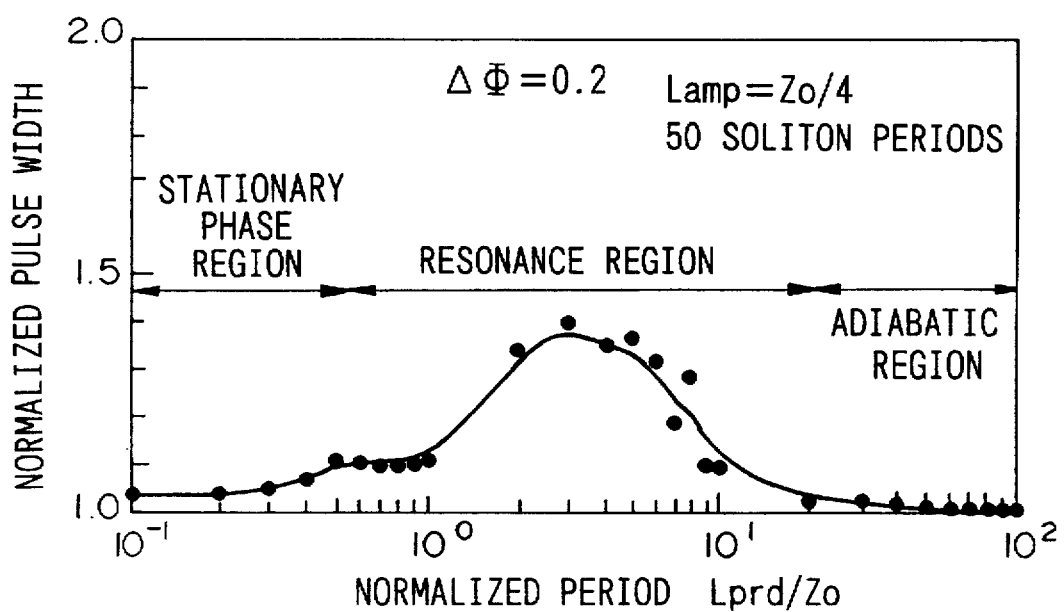
FIG. 5 is a diagram showing the relationship between the normalized dispersion variation period and the normalized pulse width variation.

FIG. 5 is a diagram showing an example of the relationship between the optical soliton pulse width after a transmission of 50 soliton periods normalized by the initial pulse width, and the repetition period of g(z) normalized by $Z_0$, when the phase fluctuations $\Delta\Phi$ are held constant at 0.2. This diagram indicates the following:

(R1) In the region wherein $L_{prd}/Z_0<0.3$ (stationary phase region), the change in the pulse widths of the optical solitons after transmission is constant if the phase fluctuations $\Delta\Phi$ are constant.

(R2) In the region wherein $0.3<L_{prd}/Z_0<20$ (resonance region), the pulse widths of the optical solitons after transmission largely change. This is known as optical soliton resonance.

(R3) In the region wherein $20<L_{prd}/Z_0$ (adiabatic region), the pulse widths of the optical solitons change in accordance with the changes in the dispersion value along the transmission direction. This is known as adiabatic change and the pulse widths of the optical solitons after transmission change only slightly.

As mentioned above, disagreement between the local dispersion in a transmission line due to dispersion variations and the average dispersion in the entire transmission line causes the carrier phase of the optical solitons to change, as a result of which the pulse widths of the optical solitons after propagation change. The carrier phase fluctuations $\Delta\Phi$ of the optical solitons due to dispersion variation can be expressed by Equation (4) if the dispersion values vary according to a sine function with a period of $L_{prd}$, an average dispersion value $D_{av}$ and an amplitude $D_0$ as shown in FIG. 4. Here, the local dispersion can be approximated as the amplitude $D_\sigma$ if the amplitude $D_\sigma$ is sufficiently large in comparison to the average dispersion value $D_{av}$ and the dispersion variation period $L_{prd}$ is sufficiently small in comparison to the soliton period $Z_0$ (i.e. when $D_\sigma \gg D_{av}$ and $L_{prd} \ll Z_0$, the conditions for $L_{prd}$ correspond to the region (R1)). At this time, Equation (4) is a parameter for pulse width broadening which occurs in a transmission line of length $L_{prd}/2$ and dispersion $D_\sigma$, and the pulse widths of the optical solitons after propagating through the transmission line broaden depending on the value of the phase fluctuations $\Delta\Phi$.

Figure 2A:
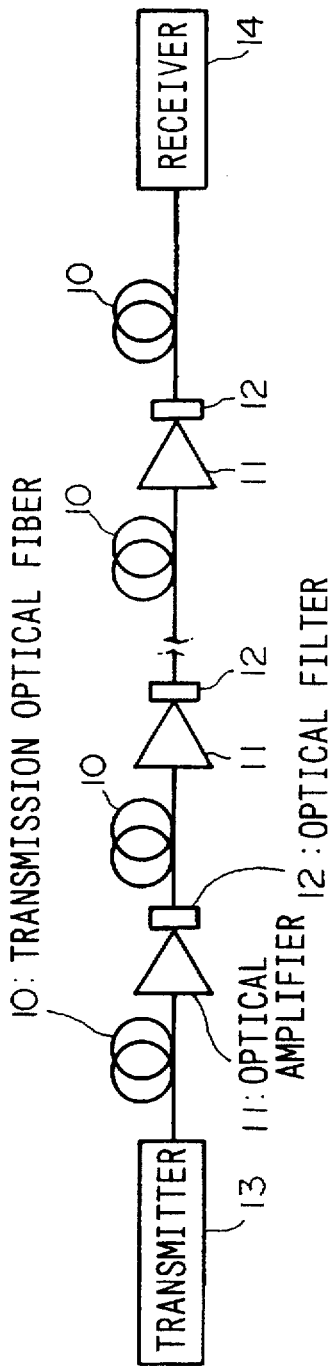
Figure 2B:
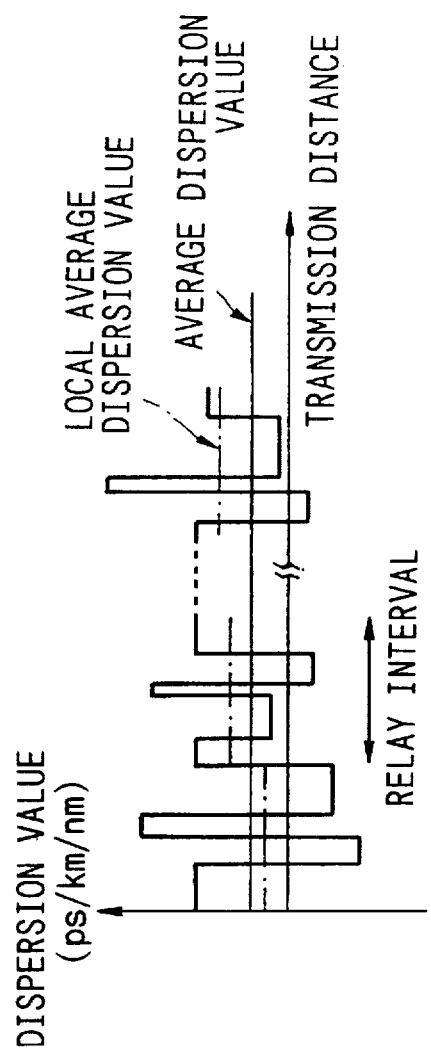
Figure 3A:
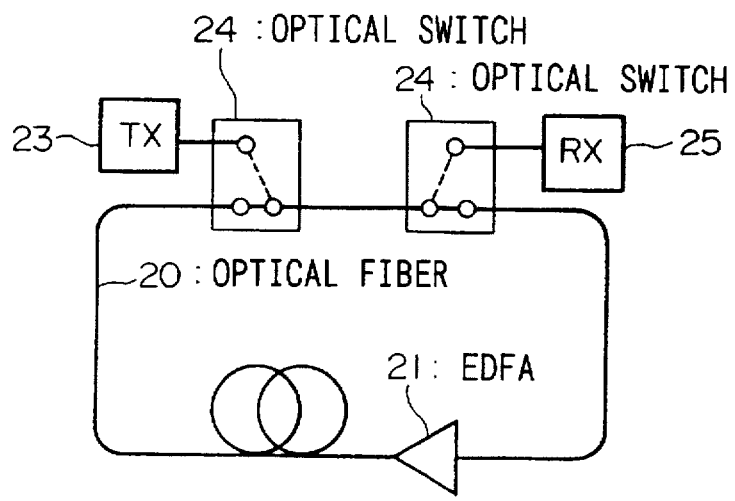
Figure 3B:
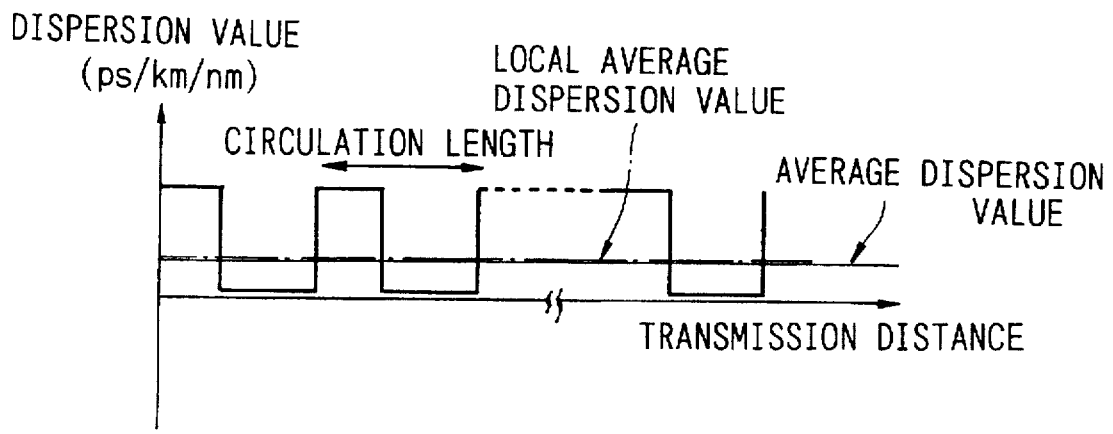

Therefore, in the region (R1), the change in the pulse width after transmission can be held to a desired value by setting the phase fluctuations $\Delta\Phi$ to less than a predetermined value, leading to the conclusion that the value of $D_\sigma L_{prd}$, a value which may be considered to be the local dispersion amount, should be restricted as can be seen from Equation (4). The upper limit value for the local dispersion can be determined as follows. The transmission speed determines the pulse width of the optical solitons. Normally, the pulse width is roughly 0.2 times the time slot in order to suppress mutual interaction between the solitons. If the 1R relay interval $L_{amp}$ (spacing between optical amplifiers (see FIG. 2)) is decided, then the average dispersion value $D_{av}$ can be determined from the relationship $Z_0 \geq 4L_{amp}$ (see [5] K. J. Blow et al., "Average Soliton Dynamics and Operation of Soliton Systems with Lumped Amplifiers", *IEEE Photon. Technol. Lett.*, pp. 369–371 (1991)). Once the allowable amount of pulse fluctuations after propagation and the transmission distance which are design objectives are decided, then the upper limit value of the local dispersion can be determined.

FIG. 6A shows the relationship between the dispersion variation period $L_{prd}$ normalized by the soliton period $Z_0$ and the pulse width variation after propagating 50 soliton periods through a transmission line having a loss of 0.2 dB/km normalized by the initial pulse width, in the region (R1) determined by means of numerical analysis using the same physical quantities as with FIG. 5. FIG. 6A shows that it is possible to hold the pulse width change after transmission to within a constant range by setting $L_{prd}$ to be sufficiently small with respect to $Z_0$ and setting the phase fluctuations $\Delta\Phi$ to less than a predetermined value. Here, while Equation (4) is modified to $D_\sigma = 2\Delta\Phi D_{av}(Z_0/L_{prd})$, it is possible to take a comparatively large allowance for the value of $D_\sigma$ by making $L_{prd}$ extremely small in comparison to $Z_0$ ($Z_0/L_{prd} \gg 1$) even if the value of $\Delta\Phi$ is made small in order to suppress the pulse width change. A numerical example is given below.

If the average dispersion value $D_{av}=0.1$ ps/km/nm and the pulse width is 5 ps, then the soliton period $Z_0$ is 100 km. Dividing this into ten relay intervals (~25 km), $L_{prd}=5$ km, FIG. 6A and Equation (4) show that the phase fluctuations $\Delta\Phi$ can be held to less than 0.3 (within 10% of the pulse width variation) if $D_\sigma \leq 1.2$ ps/km/nm. Therefore, it is possible to use optical fibers having dispersion values of −1.1 to 1.3 ps/km/nm. Additionally, by dividing into n relay intervals, the average dispersion precision for each relay interval can be improved to $1/\sqrt{n}$ due to statistical properties, and it is possible to suppress long-period dispersion variation.

Figure 7:
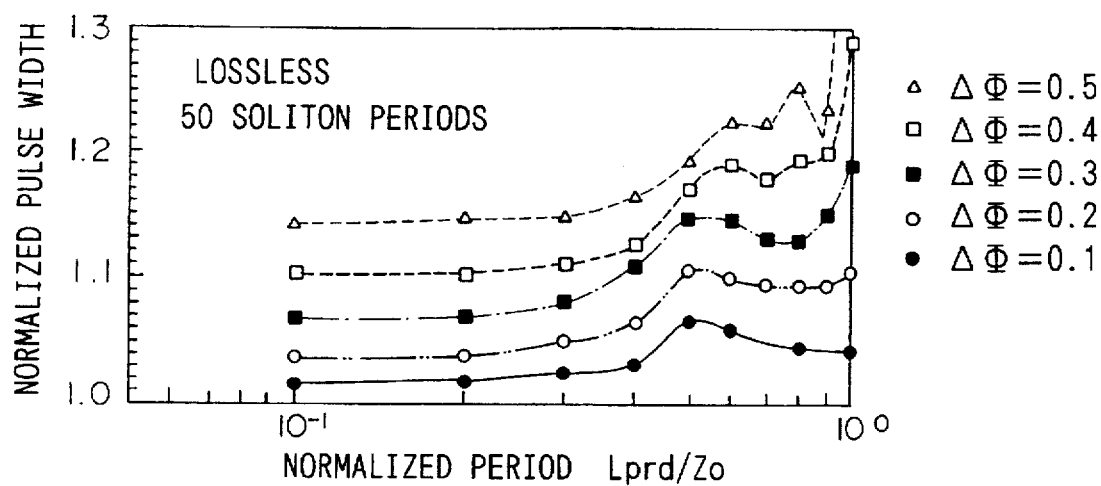
FIG. 7 is a diagram showing the relationship between the normalized dispersion variation period and the normalized pulse width variation when there is no loss in the transmission line.

For the purposes of comparison, the relationship between the pulse width variation after propagating 50 soliton periods through a loss-less transmission line normalized by the initial pulse width and the dispersion variation period $L_{prd}$ normalized by the soliton period $Z_0$, in the region (R1) is shown in FIG. 7.

Next, the design or manufacturing conditions of an optical fiber transmission line according to the present invention as shown in FIG. 1 is explained with reference to the relationship shown in FIG. 6A. With regard to the design, even if the dispersion variation period $L_{prd}$ is set to some value, the actual fiber will not necessarily strictly agree with that value. That is, the lengths of fiber pairs having dispersion values larger than and smaller than the average dispersion value $D_{av}$ can be considered to vary. If $L_{prd}$ is set within the oscillation region on the righthand side of FIG. 6A in this type of transmission line, the pulse widths will vary due to the fluctuating lengths of the fiber pairs, so as to make the value unpredictable. When actually performing optical soliton transmissions, devices such as optical filters are provided in order to stabilize the waveform (see Document [1]), and the parameters of each device (such as the bandwidth of the optical filter) are set to desired values with the pulse widths of the optical solitons as a standard. However, in transmission lines wherein the pulse width variation is unpredictable as described above, the parameters of the devices cannot be set and actual design is impossible. On the other hand, eliminating the oscillation region on the righthand side (the region on the righthand side of the single-dotted chain line in FIG. 6A) in the relationship between the normalized pulse width and the normalized period causes the pulse width variation to no longer depend on the change in $L_{prd}$, so as to make it possible to design the parameters of the devices. As a result, a predetermined transmission line can be realized exactly as conceived.

Figure 6B:
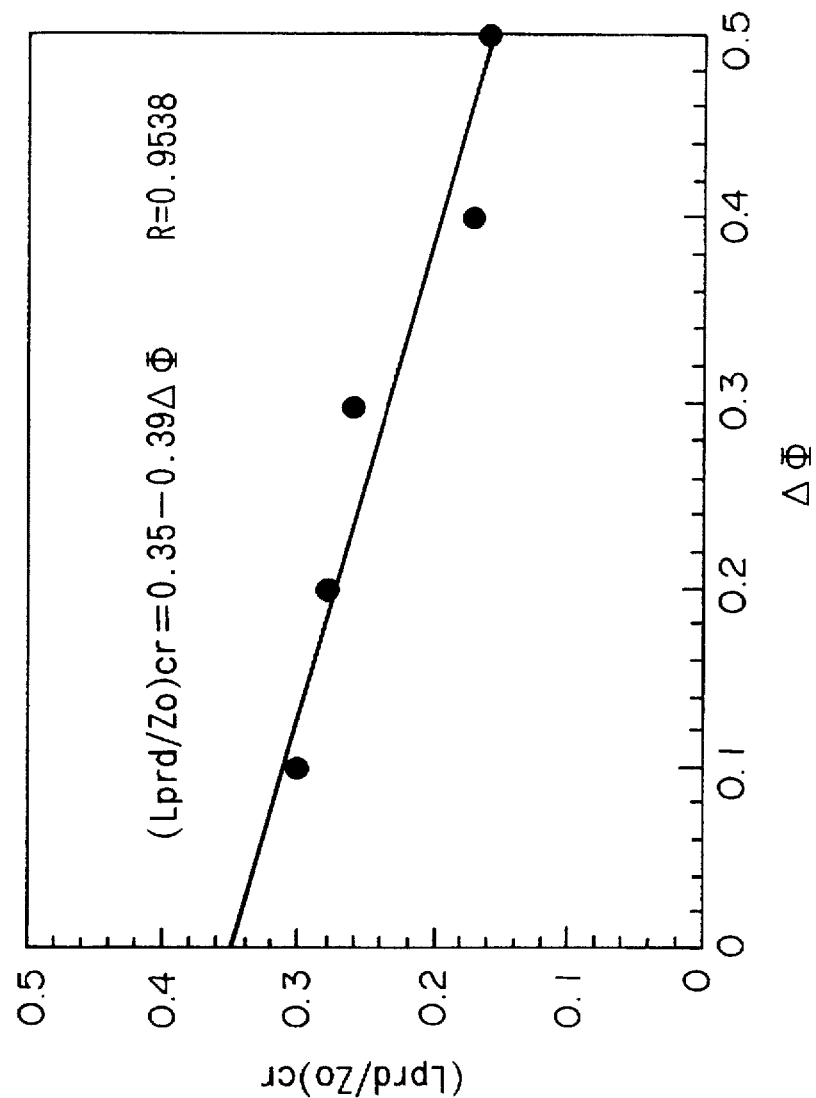
FIG. 6B is a diagram showing the upper limit condition for design of the normalized dispersion variation period $L_{prd}$/the soliton period $Z_0$ in the present invention as obtained from the relationship shown in FIG. 6A.

From the relationship between the normalized pulse width variation and the normalized dispersion variation period $L_{prd}/Z_0$ shown in FIG. 6A, the normalized dispersion variation periods $L_{prd}/Z_0$ at which the normalized pulse width variation begins to oscillate was read for respective phase fluctuations $\Delta\Phi$, and these were defined as $(L_{prd}/Z_0)cr$. FIG. 6B shows the results after plotting $(L_{prd}/Z_0)cr$ with respect to each $\Delta\Phi$ and determining their relationship by linear approximation. The resulting approximation line was $$(L_{prd}/Z_0)cr = 0.35 - 0.39\Delta\Phi \tag{6}$$

wherein the correlation coefficient R was 0.9538. This line corresponds to the single-dotted chain line in FIG. 6A. In FIG. 6B, the region below the line corresponds to the region to the lefthand side of the single-dotted chain line in FIG. 6A. Therefore, in order to eliminate the normalized pulse width oscillation region, the transmission line should be designed to satisfy to following equation.

$$L_{prd}/Z_0 < 0.35 - 0.39\Delta\Phi \tag{7}$$

From Equation (7), the conditions for the dispersion variation period $L_{prd}$ in terms of the amplitude $D_\sigma 0$ can be found using the definition of $\Delta\Phi$ expressed in Equation (4) as follows.

$$L_{prd}/Z_0 < 0.35/\{1 + 0.20(D_\sigma/D_{av})\} \tag{8}$$

Figure 6C:
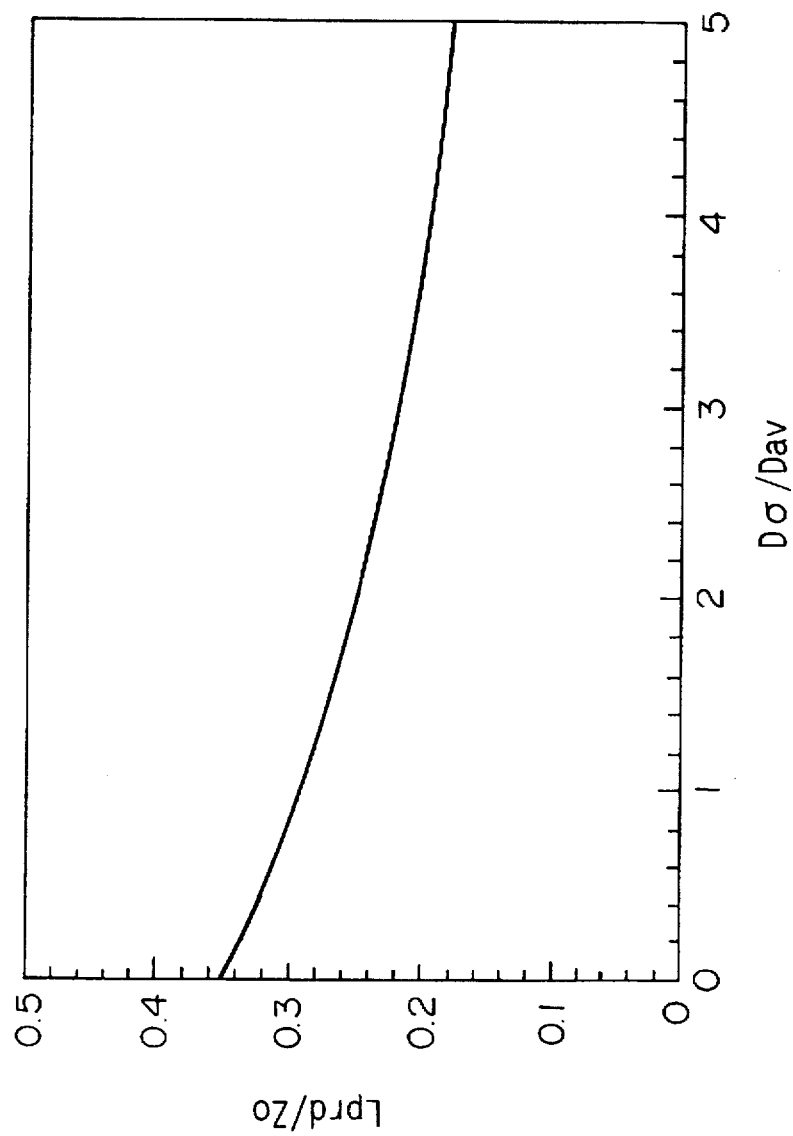
FIG. 6C is a diagram showing the conditions of FIG. 6B converted into the relationship between the normalized dispersion variation period $L_{prd}$/the soliton period $Z_0$ and the amplitude of the dispersion variation.

This corresponds to the region below the curve in FIG. 6C. In actual transmission lines, the amplitude $D_\sigma$ is not constant as shown in FIG. 4, and varies so as to fluctuate above and below the average dispersion value $D_{av}$. Therefore, the larger of the values for the differences $D_i$ and $D_i'$ (in FIG. 1, the values for both of the optical fibers are taken to be $D_i$ for the purposes of simplification) between the dispersion values of the optical fibers combined as a pair and the average dispersion value $D_{av}$ should be chosen as the value of the amplitude $D_\sigma$. Additionally, if the lengths of the optical fibers forming a pair are taken to be respectively $L_i$ and $L_i'$ (in FIG. 1, the lengths of both of the optical fibers are taken to be L), the value of the dispersion variation period $L_{prd}$ can be determined to be their sum $L_i + L_i'$.

Figure 8:
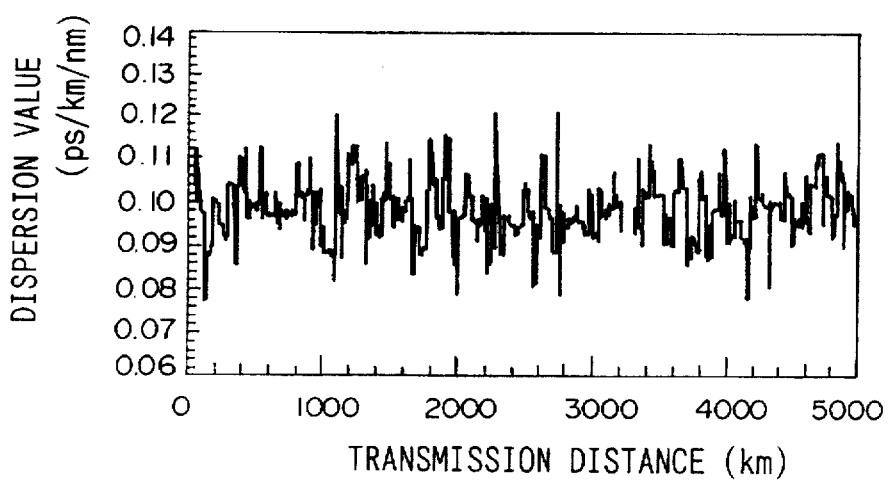
FIG. 8 is a diagram showing an example of the optical soliton transmission line dispersion distribution prepared by computer using a statistical method wherein the standard deviation of the measurement precision for the dispersion values was 0.02 ps/km/nm. In this diagram, the dispersion distribution is averaged over a relay interval (25 km).
Figure 9:
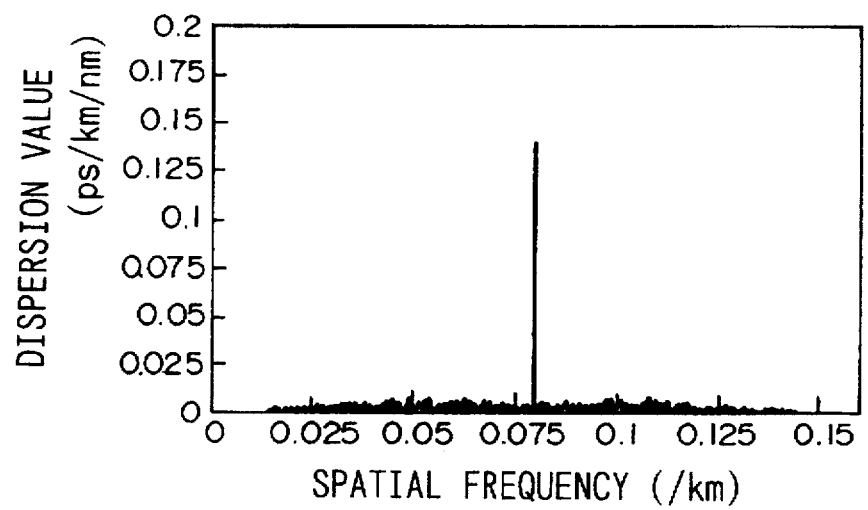
FIG. 9 is a diagram showing the spatial spectrum of the dispersion distribution shown in FIG. 8.

In an example wherein the upper limit of the local dispersion $D_oL$ was determined such that the pulse width variation was within 10% after propagation over 5000 km in the case of a pulse width of 5 ps (corresponding to a transmission speed of 40 Gb/s), an average dispersion value $D_{av}$=0.1 ps/km/nm, and a 1R relay interval $L_{amp}$=25 km, the range of dispersion values for usable optical fibers was determined with L as 6.25 km, and the fluctuation of the dispersion prepared by means of a computer such that the optical fibers were uniformly distributed within this range was averaged by each relay interval. This dispersion distribution is shown in FIG. 8. Here, the standard deviation of measurement errors upon measurement of the dispersion in the optical fibers was taken to be 0.02 ps/km/nm in consideration of the performance of present dispersion measuring devices. FIG. 9 shows the spatial spectrum of the dispersion distribution in FIG. 8. Low frequency components appear in the spatial spectrum due to the influence of dispersion measurement errors in the optical fiber. Since frequency components belonging to the resonance region (R2) described above are contained within these low frequency components, the pulse width variations after propagation are prevented from being suppressed to within the designed values.

Figure 10:
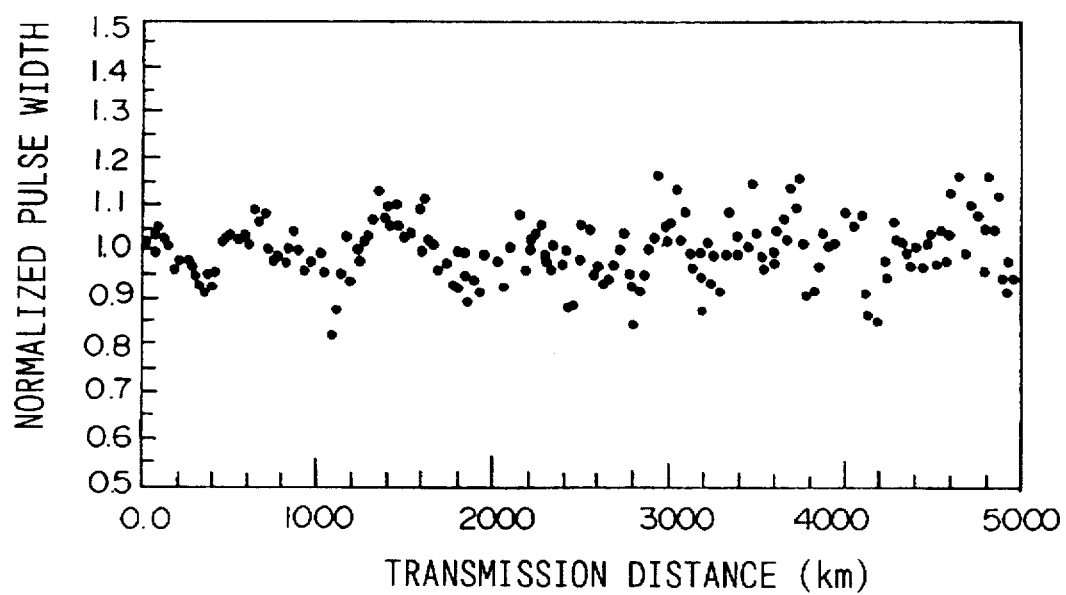
FIG. 10 is a diagram showing the change in pulse width with respect to the transmission distance in a transmission line having the dispersion distribution shown in FIG. 8.
Figure 11A:
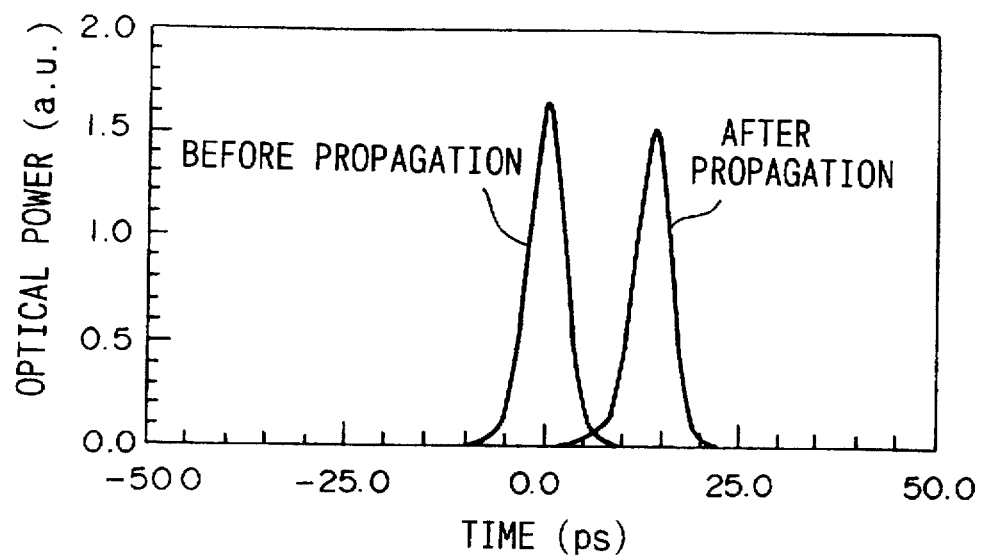
FIGS. 11A and 11B are diagrams showing the change in the pulse waveform before and after propagation, wherein the vertical axis in FIG. 11A has a linear scale and the vertical axis in FIG. 11B has a logarithmic scale.
Figure 11B:
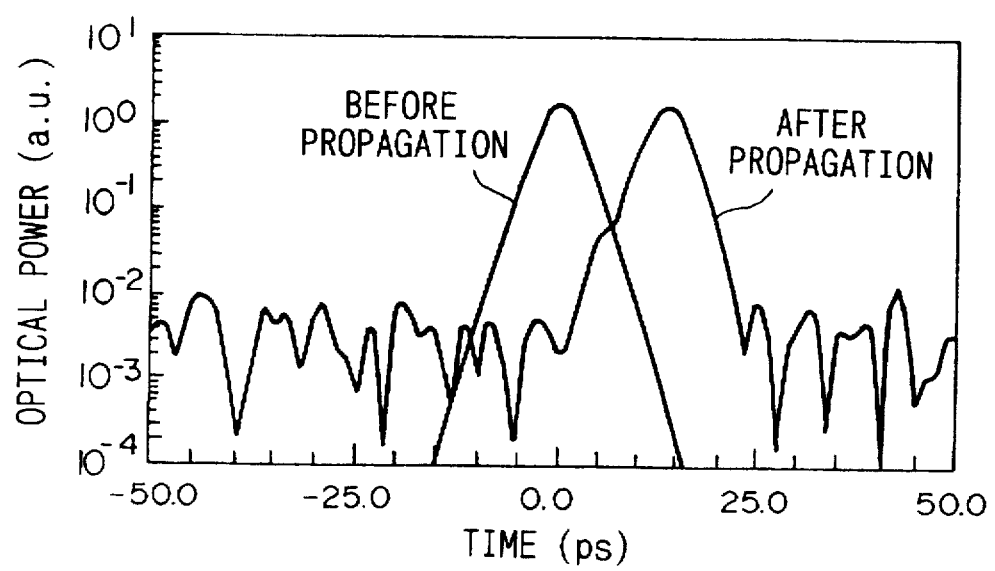
Figure 12:
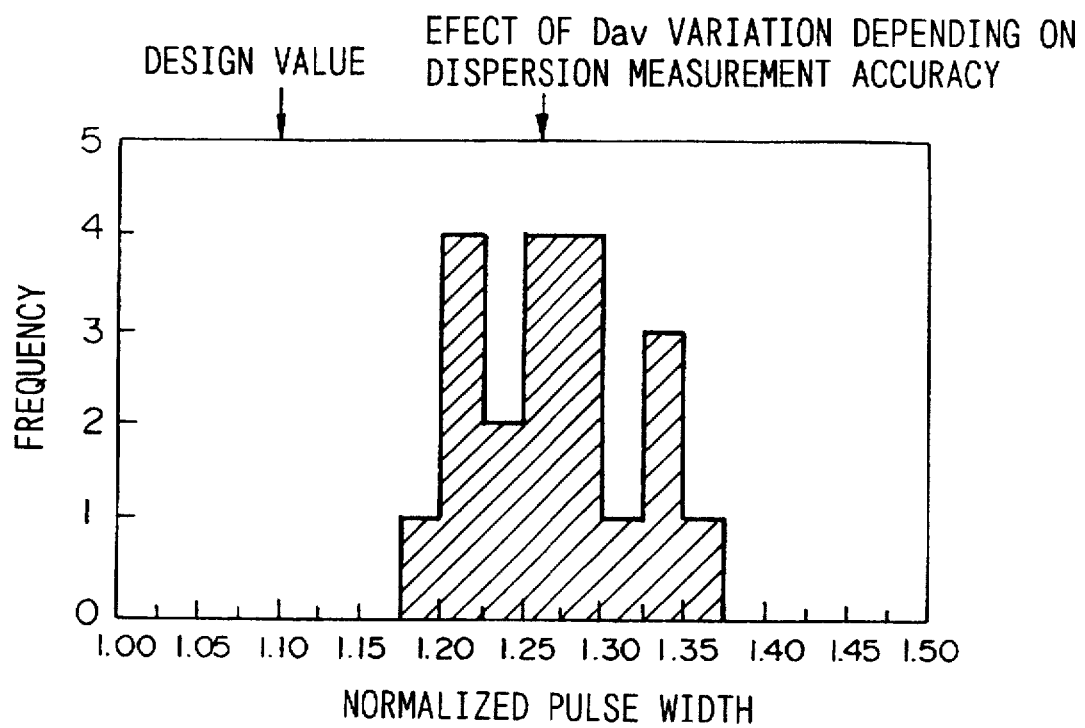
FIG. 12 is a diagram showing the number of pulse width changes for pulse propagations simulated respect to dispersion distributions which were generated 20 times according to a statistical method.

FIG. 10 shows the relationship between the pulse width change and transmission distance determined by performing a computer simulation of a pulse propagation in accordance with the dispersion distribution of FIG. 8. As a result, the pulse width variation after propagation can be suppressed to within 20%. Additionally, FIGS. 11A and 11B show the pulse waveform before and after propagation. It can be seen that although the dispersive waves accompany the pulse waveform after propagation, their optical intensity is held to less than 1% of the peak value of the optical pulse. 20 different types of dispersion distributions were generated by computer such as to satisfy the above-mentioned dispersion management conditions, and computer simulations of pulse propagation were performed for each dispersion distribution. FIG. 12 shows the number of pulse width changes after propagation. The results show that the pulse width variations are larger than the designed values due to the generation of low frequency components in the variations in $D_{av}$ due to measurement errors in the dispersion.

Figure 13:
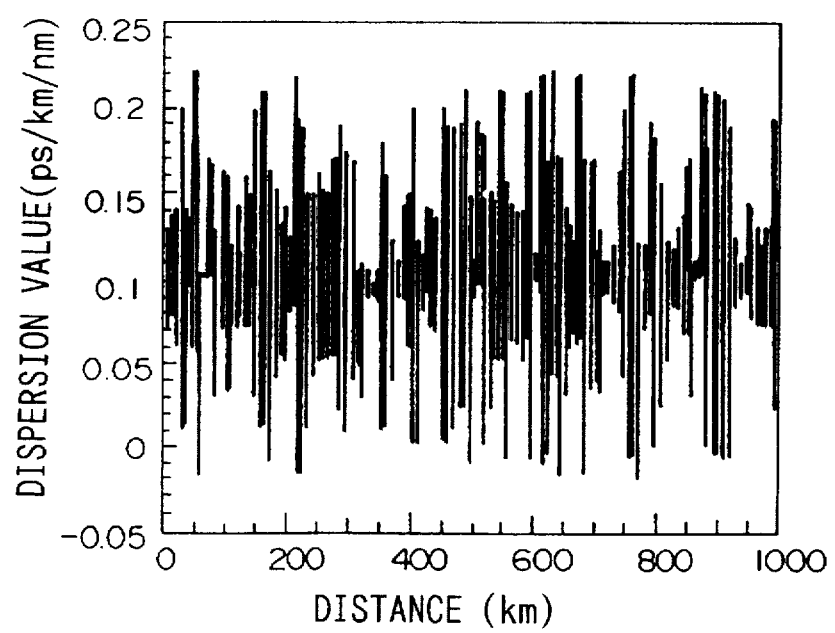
FIG. 13 is a diagram showing the dispersion distribution of an optical soliton transmission line prepared based on the embodiment shown in FIG. 1.
Figure 14:
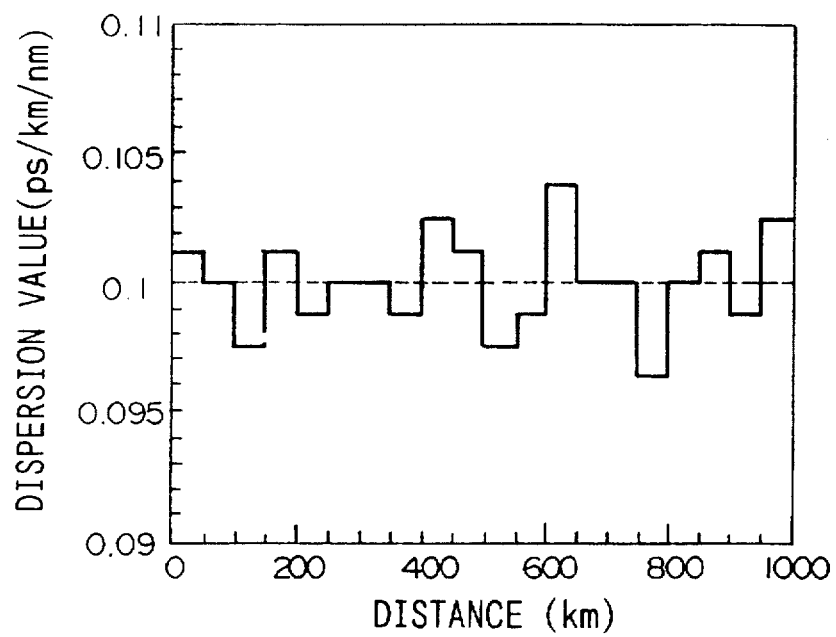
FIG. 14 is a diagram showing the dispersion distribution shown in FIG. 13 averaged by every relay interval of 50 km.
Figure 15:
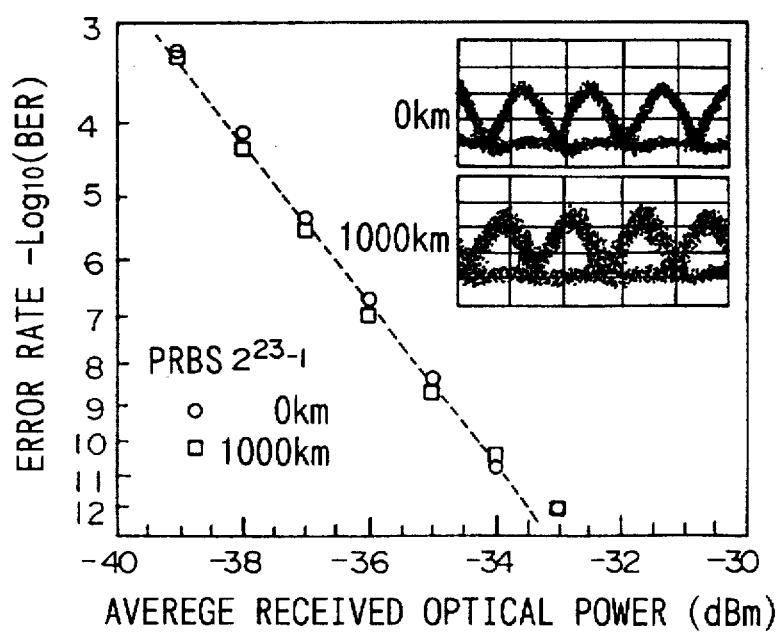
FIG. 15 is a diagram showing the error-rate characteristics before and after transmission for 40 Gb/s optical soliton transmissions using a dispersion-managed optical fiber shown in FIG. 14.

FIG. 13 is a diagram showing the dispersion distribution of 1000 km optical fibers prepared with an average dispersion of 0.1 ps/km/nm, a transmission speed of 40 Gb/s, $D_i$ and L designed such that the pulse width variations would be suppressed to within 10% after a distance of 5000 km, and a length L of 6.25 km. FIG. 14 is a diagram showing the dispersion distribution wherein the dispersion distribution of FIG. 13 has been averaged over each interval when the relay interval $L_{amp}$ is 50 km. This shows that the dispersion variation with respect to transmission distance is suppressed to within ±3% with respect to the average dispersion. FIG. 15 shows the relationship between error rate and the average received optical power for a 40 Gb/s (pulse width 7 ps) transmission experiment using these optical fibers. This shows that there is no error rate degradation with respect to the average received optical power due to waveform degradation before and after transmission, since there are almost no pulse width variations after transmission.

Figure 16:
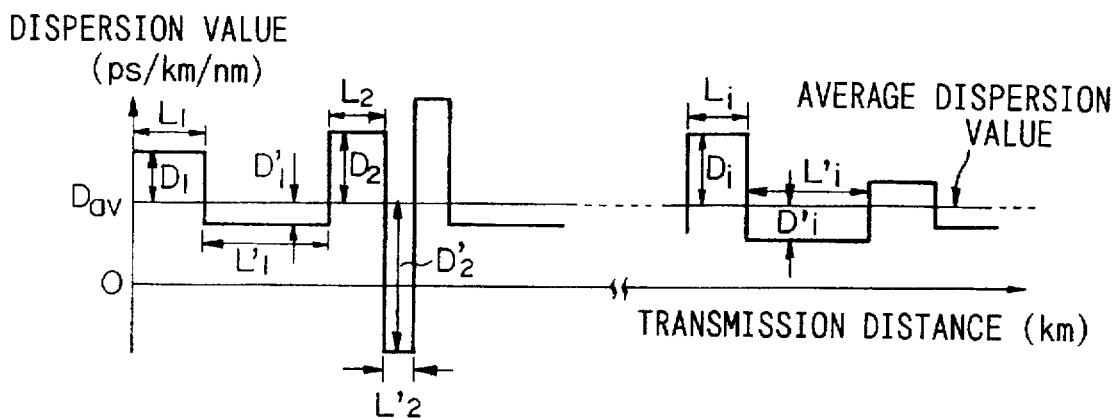
FIG. 16 is a diagram showing the dispersion characteristics of an optical transmission line according to another embodiment of the present invention.

FIG. 16 is a diagram showing the relationship between the transmission distance and dispersion value in an optical fiber transmission line according to another embodiment of the present invention. In this embodiment, each pair of corresponding optical fibers is formed from an optical fiber having a length $L_i$ and a dispersion value amplitude $D_i$ at the average dispersion value $D_{av}$ and an optical fiber having a length $L_i'$ and a dispersion value amplitude $D_i'$ such that the local average dispersion with the other fiber is equal to the average dispersion $D_{av}$ over the entire transmission distance. Here, the value of $D_i' \times L_i'$ is set so as to be approximately equal to the value of $D_i \times L_i$. In this embodiment also, as explained above, the maximum values of $D_i$ and $L_i$ are determined such that the pulse width variation is suppressed to within the designed range after propagation with respect to a given transmission speed and transmission distance, each pair of optical fibers is selected within this range, and these are connected alternately. Additionally, the lengths $L_i$ and $L_i'$ are selected to be shorter than the soliton length $Z_0$.

Figure 17:
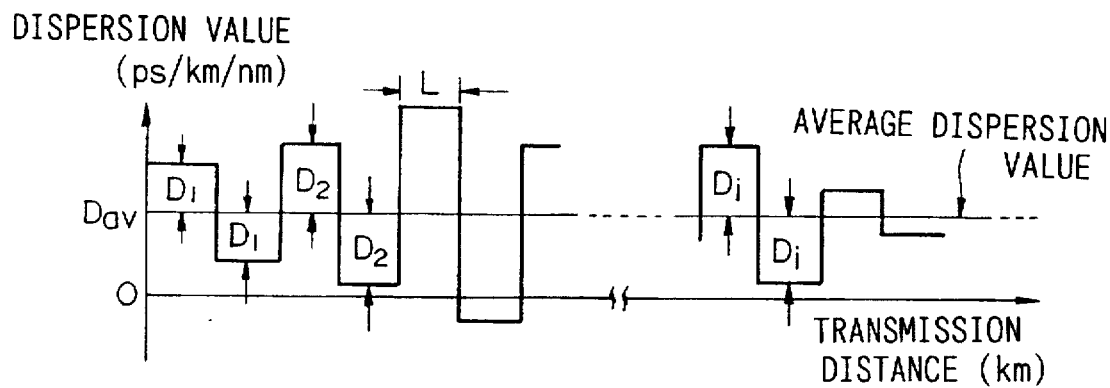
FIG. 17 is a diagram showing the dispersion characteristics of an optical transmission line according to another embodiment of the present invention.

FIG. 17 is a diagram showing the relationship between the transmission distance and dispersion value in an optical fiber transmission line according to another embodiment of the present invention. In this embodiment, each pair of corresponding optical fibers is formed from an optical fiber having a length L, a dispersion slope S and a dispersion value $D_{av}+D_i$, and an optical fiber having a length L, a dispersion value $D_{av}-D_i$ symmetric with respect to the average dispersion $D_{av}$, and a dispersion slope S' (= −S or at least a value having the opposite sign from that of S). Additionally, as explained above, the maximum values of $D_i$ and $L_i$ are determined such that the pulse width variation is suppressed to within the designed range after propagation with respect to a given transmission speed and transmission distance, each group of corresponding optical fibers is selected within this range, and these are connected alternately. Additionally, the lengths L are selected to be shorter than the soliton period $Z_0$. In this case, the signs of the dispersion slopes S and S' are different, so that they mutually reduce the effects of higher-order dispersion (variations of the dispersion value with respect to wavelength). Furthermore, when the absolute values of the dispersion slopes are equal, waveform distortion after transmission due to higher-order dispersion can be suppressed because of the cancellation of higher-order dispersion.

Figure 18:
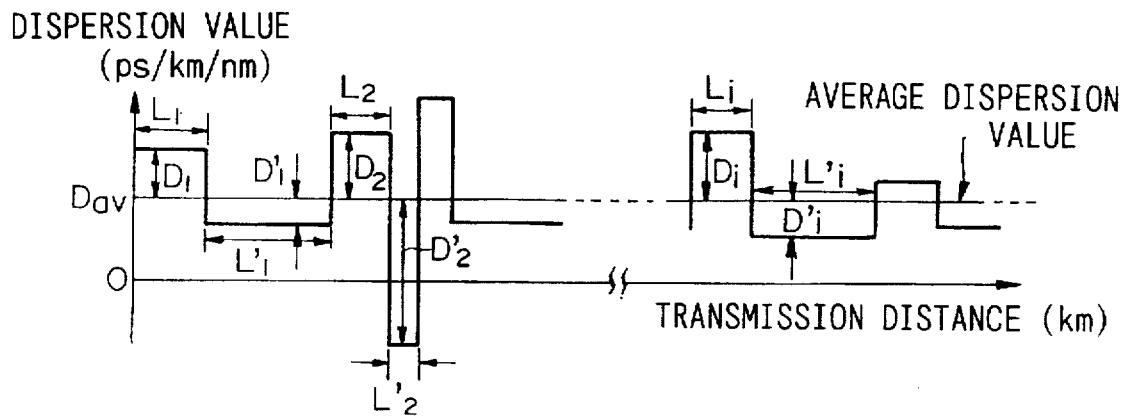
FIG. 18 is a diagram showing the dispersion characteristics of an optical transmission line according to another embodiment of the present invention.

FIG. 18 is a diagram showing the relationship between the transmission distance and the dispersion value in an optical fiber transmission line according to another embodiment of the present invention. In this embodiment, each pair of corresponding optical fibers is formed from an optical fiber having a length $L_i$, a dispersion slope S and a dispersion value amplitude $D_i$ with respect to the dispersion value $D_{av}$, and an optical fiber having a length $L_i'$, a dispersion slope S' (= −S or at least a value having the opposite sign from that of S), and a dispersion value amplitude $D_i'$ such that the local average dispersion with the other fiber is equal to the average dispersion $D_{av}$ over the entire transmission distance. Furthermore, the sum of $S_iL_i$ and $S_i'L_i'$ is made equal to zero. As explained above, the maximum values of $D_i$ and $L_i$ are determined such that the pulse width variation is suppressed to within the designed range after propagation with respect to a given transmission speed and transmission distance, each pair of optical fibers is selected within this range, and these are connected alternately. Additionally, the lengths $L_i$ and $L_i'$ are selected to be shorter than the soliton period $Z_0$. In this embodiment, the signs of the dispersion slopes S and S' are different, so that they mutually reduce the effects of higher-order dispersion. Furthermore, when the absolute values of the dispersion slopes are equal, waveform distortion after transmission due to higher-order dispersion can be suppressed because of cancellation of higher-order dispersion.

Figure 19:
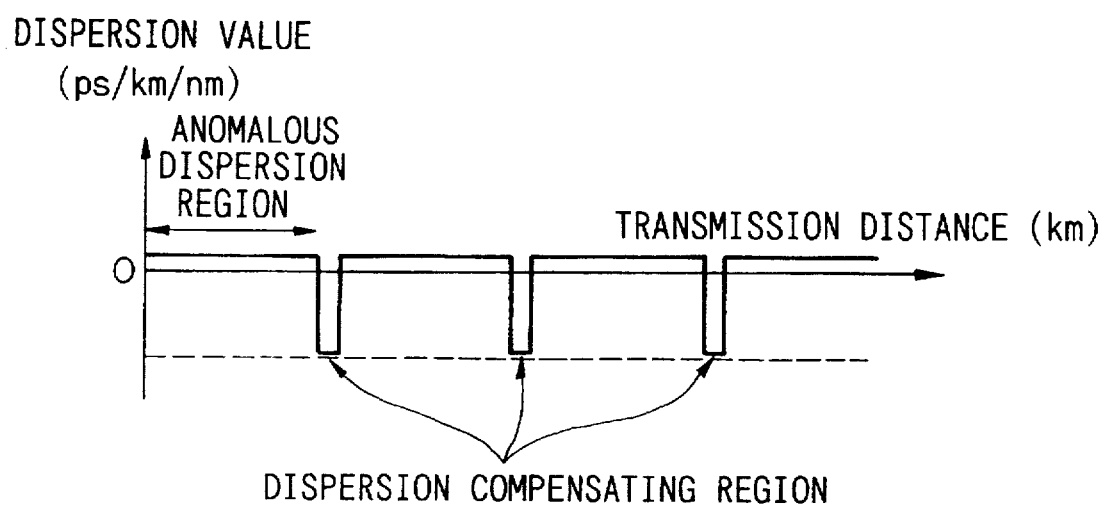
FIG. 19 is a diagram showing the dispersion characteristics of a transmission line according to an embodiment of the present invention wherein dispersion management is performed for RZ signal transmissions.

Additionally, FIG. 19 is a diagram showing the relationship between the transmission distance and the dispersion value for explaining the case wherein the optical fiber transmission line of the present invention is used for a case requiring the management of the average dispersion value in the anomalous dispersion region or the normal dispersion region for dispersion management in RZ signal transmissions (rectification zero; see [6] N. Edagawa et al., "20 Gbit/s, 8100 km Straight-line Single-channel Soliton-based RZ Transmission Experiment Using Periodic Dispersion Compensation", ECOC '95, Th. A. 3.5 (1995)). As shown in FIG. 19, in transmission lines for use in RZ signal transmissions, dispersion compensating fibers of normal dispersion are inserted at predetermined intervals so as to compensate for anomalous dispersion to make the average dispersion value over the entire transmission line equal to a predetermined value. In this case also, the values of dispersion, length and the like of the optical fibers used for dispersion compensation are determined in the same manner as with the above-described embodiments. In this way, the dispersion management of the present invention can also be applied to cases of respectively managing the average dispersion value in the anomalous dispersion region and the normal dispersion region for RZ signal transmissions.

As explained above, according to the present invention, it is possible to economically form an optical fiber transmission line suitable for optical soliton transmissions having uniform dispersion value characteristics, using optical fibers with fluctuating dispersion values.

Additionally, the optical fiber transmission line and system according to the present invention can be applied to long-distance undersea optical communications systems or domestic high-capacity mainline optical communications systems.

While embodiments of the present invention are explained above with reference to the drawings, the present invention can be realized in various forms as long as they do not contradict the main features or the spirit of the present invention. Therefore, the above-described embodiments are simply examples with regard to various points, and should not be interpreted in a restrictive manner. The scope of the present invention is outlined in the claims, and is in no way constrained by the descriptions in the specification. Furthermore, any modifications or changes which belong within the scope of the claims according to the Doctrine of Equivalents also are included within the scope of the present invention.

We claim:

1. An optical fiber transmission line comprising:
   first optical fibers having dispersion values greater than an average dispersion value $D_{av}$ over the entire transmission distance; and
   second optical fibers having dispersion values less than the average dispersion value $D_{av}$;
   wherein said first optical fibers and said second optical fibers are connected alternately; the average dispersion value $D_{av}$ over the entire transmission distance is in an anomalous dispersion region; the respective lengths $L_i$ and $L_i'$ of the first and second optical fibers, i being an arbitrary natural number, are shorter than a soliton length $Z_0$; and the relationship between the lengths $L_i$ and $L_i'$ and the larger of the respective differences $D_i$ and $D_i'$ between the dispersion values of the first and second optical fibers and the average dispersion value $D_{av}$ satisfies the following condition:

$$(L_i + L_i')/Z_0 < 0.35 / \{1 + 0.20(\text{the larger of } D_i \text{ and } D_i')/D_{av}\}$$

2. An optical fiber transmission line in accordance with claim 1, wherein the respective lengths $L_i$ and $L_i'$ of said first and second optical fibers are equal.

3. An optical fiber transmission line in accordance with claim 1, wherein the signs of the dispersion slopes S of said first optical fibers and the signs of the dispersion slopes S' of said second optical fibers are opposite.

4. An optical fiber transmission line in accordance with claim 1, wherein the sum between the product of the length $L_i$ of said first optical fibers and the dispersion slope S of said first optical fibers $SL_i$ and the product of the length $L_i'$ of said second optical fibers and the dispersion slope S' of said first optical fibers $S'L_i'$ is equal to zero.

5. An optical fiber transmission system comprising:
   an optical fiber transmission line in accordance with any one of claims 1–4;
   a transmitter for transmitting optical signals to said optical fiber transmission line, and a receiver.

6. A production method for optical fiber transmission lines comprising steps of:
   combining at least one pair of first and second optical fibers having mutually different dispersion values alternately;
   setting the average dispersion value $D_{av}$ over the entire transmission distance to be in an anomalous dispersion region;
   making the dispersion values of said first optical fibers greater than the average dispersion value $D_{av}$ of said transmission line;
   making the dispersion values of said second optical fibers less than the average dispersion value $D_{av}$ of said transmission line;
   making the respective lengths $L_i$ and $L_i'$ of the first and second optical fibers, i being an arbitrary natural number, shorter than a soliton length $Z_0$; and
   setting the relationship between the lengths $L_i$ and $L_i'$ and the larger of the respective differences $D_i$ and $D_i'$ between the dispersion values of the first and second optical fibers and the average dispersion value $D_{av}$ so as to satisfy the following condition:

$$(L_i + L_i')/Z_0 < 0.35 / \{1 + 0.20(\text{the larger of } D_i \text{ and } D_i')/D_{av}\}.$$

7. A production method for optical fiber transmission lines in accordance with claim 6, wherein the respective lengths $L_i$ and $L_i'$ of said first and second optical fibers are made equal.

8. A production method for optical fiber transmission lines in accordance with claim 6, wherein the signs of the dispersion slopes S of said first optical fibers and the signs of the dispersion slopes S' of said second optical fibers are made opposite.

9. A production method for optical fiber transmission lines in accordance with claim 6, wherein the sum between the product of the length $L_i$ of said first optical fibers and the dispersion slope S of said first optical fibers $SL_i$ and the product of the length $L_i'$ of said second optical fibers and the dispersion slope S' of said first optical fibers $S'L_i'$ is made equal to zero.

10. A method of combining optical fibers comprising steps of:
    combining first optical fibers having dispersion values greater than an average dispersion value $D_{av}$ over the entire transmission distance and second optical fibers having dispersion values less than the average dispersion value $D_{av}$ alternately;
    choosing the average dispersion value $D_{av}$ over the entire transmission distance to be in an anomalous dispersion region;

making the respective lengths $L_i$ and $L_i'$ of the first and second optical fibers, i being an arbitrary natural number, shorter than a soliton length $Z_0$; and making the relationship between the lengths $L_i$ and $L_i'$ and the larger of the respective differences $D_i$ and $D_i'$ between the dispersion values of the first and second optical fibers and the average dispersion value $D_{av}$ satisfy the following condition:

$(L_i+L_i')/Z_0<0.35/\{1+0.20(\text{the larger of } D_i \text{ and } D_i')/D_{av}\}$.

* * * * *